United States Patent
Baumann et al.

(10) Patent No.: US 9,899,824 B2
(45) Date of Patent: Feb. 20, 2018

(54) RESIDUAL CURRENT PROTECTION DEVICE AND ELECTRICAL PROTECTION CONFIGURATION FOR EXTERNAL ACTUATION OF AN ELECTROMAGNETIC RELEASE

(71) Applicant: SIEMENS AKTIENGESELLSCHAFT, Munich (DE)

(72) Inventors: Mathias Baumann, Zirndorf (DE); Michael Strassburger, Ensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 422 days.

(21) Appl. No.: 14/607,263

(22) Filed: Jan. 28, 2015

(65) Prior Publication Data
US 2015/0214715 A1    Jul. 30, 2015

(30) Foreign Application Priority Data

Jan. 28, 2014    (DE) .......... 10 2014 201 501

(51) Int. Cl.
*H02H 3/00*    (2006.01)
*H01H 71/02*    (2006.01)
(Continued)

(52) U.S. Cl.
CPC .......... *H02H 3/00* (2013.01); *H01H 71/0228* (2013.01); *H01H 83/02* (2013.01);
(Continued)

(58) Field of Classification Search
CPC ...... H02H 3/00; H01H 71/0228; H01H 83/02; H01H 83/04; H01H 83/144; H01H 2083/203
See application file for complete search history.

(56) References Cited

U.S. PATENT DOCUMENTS 5,490,086 A    2/1996    Leone et al.
5,757,598 A *  5/1998    Aromin ............. H02H 3/33
                                                361/42
(Continued)

FOREIGN PATENT DOCUMENTS

DE    20015238 U1    12/2000
DE    20219429 U1    3/2003
(Continued)

OTHER PUBLICATIONS

Belzner P. et al; "Schalten, Schützen, Verteilen in Niederspannungsnetzen"; Siemens Erlangen, Handbook—3rd Edition, Jan. 1, 1992 (Jan. 1, 1992) pp. 262-263; ISBN: 978-3-80-094122-3; XP055171458—English translation of 5 Handling and Servicing the Switching Devices.
(Continued)

*Primary Examiner* — Zeev V Kitov
(74) *Attorney, Agent, or Firm* — Laurence Greenberg; Werner Stemer; Ralph Locher

(57) ABSTRACT

A compact residual current protection device is connected to a circuit breaker or a load break switch for external tripping and includes a detection device for detecting a residual current and a tripping device which is actuable by the detection device for tripping the circuit breaker as a result of actuation by the tripping device. A connection device is connected to the tripping device for connecting a switching device. The detection device and the tripping device are constructed in such a way that the tripping device is able to be tripped through the connection device by the switching device independently of the detection device. An electrical protection configuration is also provided.

10 Claims, 1 Drawing Sheet

(51) Int. Cl.
*H01H 83/02* (2006.01)
*H01H 83/04* (2006.01)
*H01H 83/14* (2006.01)
*H01H 83/20* (2006.01)

(52) U.S. Cl.
CPC .......... *H01H 83/04* (2013.01); *H01H 83/144* (2013.01); *H01H 2083/203* (2013.01)

(56) References Cited

U.S. PATENT DOCUMENTS

| | | |
|---|---|---|
| 2001/0022713 A1 | 9/2001 | Gimenez et al. |
| 2002/0180444 A1 | 12/2002 | Bauer |
| 2005/0023120 A1* | 2/2005 | Puskar ................. H01H 71/123 200/321 |
| 2007/0236841 A1 | 10/2007 | Asano et al. |
| 2008/0204947 A1 | 8/2008 | Shea et al. |
| 2010/0324747 A1 | 12/2010 | Lee et al. |
| 2013/0329331 A1 | 12/2013 | Erger et al. |
| 2015/0009592 A1* | 1/2015 | Aromin ................... H02H 3/32 361/42 |
| 2015/0062769 A1* | 3/2015 | Cortes Rico ............. H02H 3/08 361/93.1 |

FOREIGN PATENT DOCUMENTS

| | | |
|---|---|---|
| EP | 0609898 A1 | 8/1994 |
| FR | 2440609 A1 | 5/1980 |

OTHER PUBLICATIONS

"Montageanweisung AWA Fehlerstrom-Relais Wandler für FI-Relais"; (Nov. 30, 2011), [found Jun. 5, 2015] Internet URL:ftp:// ftp.moeller.net/DOCUMENTATION/AWA_INSTRUCTIONS/ IL01219036Z2011_01.pdf; XP055194014.
Moeller—Montageanweisung AWA PZ4 UA, (Nov. 30, 2011), XP055194010; [Found Jun. 5, 2015] Internet URL:ftp://ftp.moeller. net/DOCUMENTATION/AWA_INSTRUCTIONS/22740205.pdf.
Siemens: "Fehlerstromschutzeinrichtung 3UL2", (Dec. 31, 1993), [Found on Jun. 5, 2015] Internet: URL:https://support.industry. siemens.com/cs/attachments/ . . . /42800323.pdf>, XP055193839.

* cited by examiner

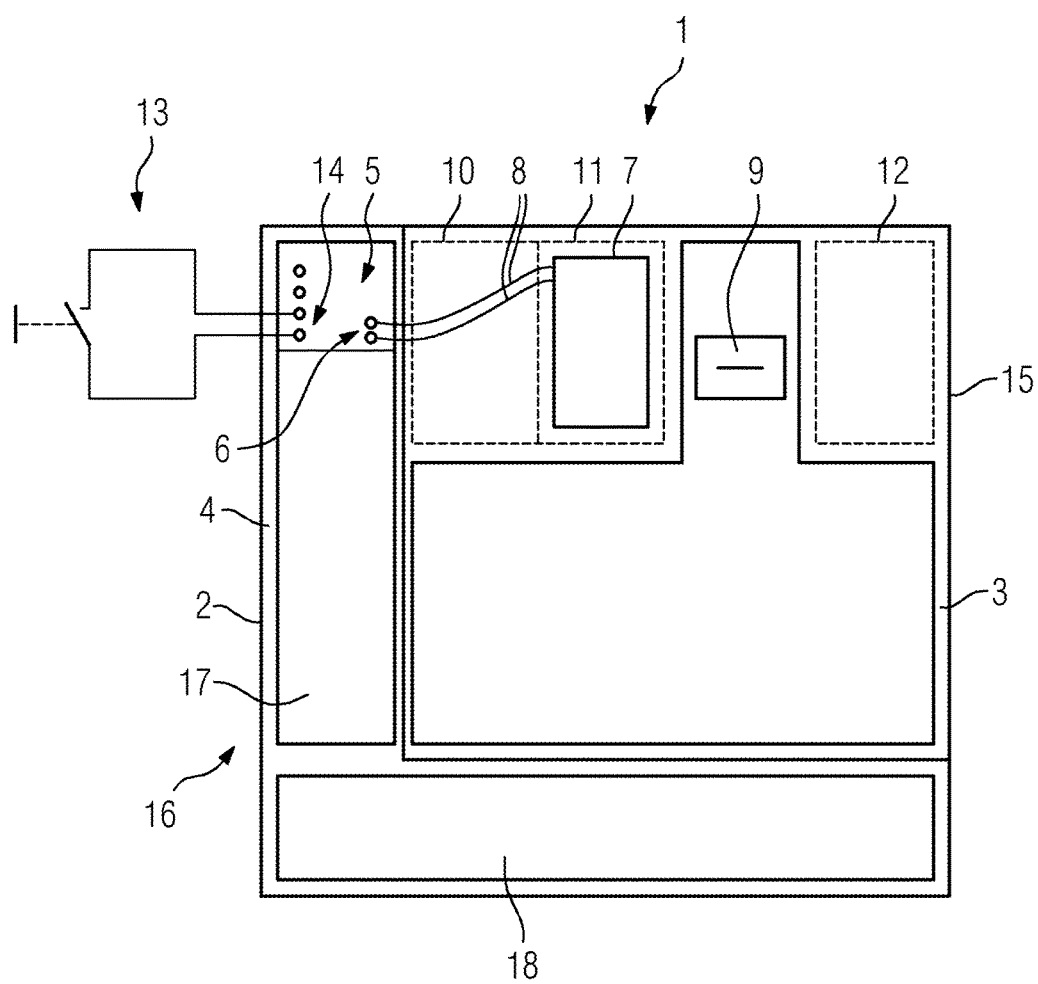

RESIDUAL CURRENT PROTECTION DEVICE AND ELECTRICAL PROTECTION CONFIGURATION FOR EXTERNAL ACTUATION OF AN ELECTROMAGNETIC RELEASE

CROSS-REFERENCE TO RELATED APPLICATION

This application claims the priority, under 35 U.S.C. § 119, of German Patent Application DE 10 2014 201 501.4, filed Jan. 28, 2014; the prior application is herewith incorporated by reference in its entirety.

BACKGROUND OF THE INVENTION

Field of the Invention

The present invention relates to a residual current protection device for connection to a circuit breaker or a load break switch and includes a detection device for detecting a residual current and a tripping device which is actuable by the detection device so that the circuit breaker trips as a result of actuation by the tripping device. Moreover, the present invention relates to an electrical protection configuration. The residual current protection device can be independent of the mains voltage (i.e. without any auxiliary voltage source), but also dependent on the mains voltage (i.e. with an auxiliary voltage source).

Residual current protection devices provide fault protection in low-voltage grids for the case in which a basic insulation has failed or direct touching contact is made with live parts. As a result, damage to humans, objects and livestock is prevented or reduced.

Residual current protection devices, i.e. differential current units or residual current units or functions, can be attached to conventional circuit breakers or implemented as an external, modular configuration. Alternatively, the residual current protection devices can also be integrated in compact circuit breakers. If, during operation of an installation, a residual current then occurs, the residual current is detected by the residual current protection device, and the residual current protection device trips the relevant (compact) circuit breaker and therefore disconnects the installation from the power supply.

In the case of special types of residual current protection devices, so-called auxiliary releases are provided as tripping devices. Those auxiliary releases are electromechanical systems in particular based on magnets, with which systems a movement, in particular for a latching mechanism, can be generated from an actuation signal as a result of a residual current. In a specific case, an auxiliary release can also be referred to as a tripping magnet. Depending on the function, there is a distinction between voltage releases and under voltage releases in the case of auxiliary releases. Voltage releases trip (i.e. generate a mechanical movement) when a voltage threshold is exceeded. Undervoltage releases trip when a voltage threshold is undershot.

The residual current protection device and the circuit breaker are generally disposed in separate housings. The circuit breaker can have a housing, in which one or more accessory pockets are provided. The abovementioned auxiliary release, an auxiliary switch, an alarm switch or the like can be plugged into such an accessory pocket. With those modular accessories, an electrical protection configuration, which can include a circuit breaker and a residual current protection device, is therefore capable of individualization.

There is the need to check the function of residual current protection devices at certain times or at certain time intervals. In particular, the tripping device also needs to be checked possibly in interaction with the circuit breaker with respect to functionality.

SUMMARY OF THE INVENTION

It is accordingly an object of the invention to provide a residual current protection device for connection to a circuit breaker and an electrical protection configuration for external actuation of an electromagnetic release, which overcome the hereinafore-mentioned disadvantages of the heretofore-known devices of this general type and in which tripping of the tripping device is also possible in a simple manner without a residual current or differential current being present.

With the foregoing and other objects in view there is provided, in accordance with the invention, a residual current protection device for connection to a circuit breaker or a load break switch, comprising a detection device for detecting a residual current, a tripping device which is actuable by the detection device, so that the circuit breaker trips as a result of actuation by the tripping device, and a connection device, which is connected to the tripping device, for connecting a switching device. The detection device and the tripping device are constructed in such a way that the tripping device is trippable through the connection device by the switching device independently of the detection device.

Advantageously, therefore, a connection device is provided on the residual current protection device so that the tripping device can be actuated through the connection device. Since there is both the possibility of tripping the tripping device through the connection device and the possibility of tripping the tripping device with the aid of the detection device, this parallel tripping option in the devices is taken into consideration electrically. In particular, care is taken to ensure that tripping through the connection device can take place independently of tripping by using the tripping device. Specifically, this has the advantage that a display unit of the detection device which displays the residual current case is not activated when, for example, tripping takes place manually through the connection device.

In accordance with another feature of the invention, preferably the residual current protection device has a housing, in which the detection device together with the connection device are permanently disposed. Therefore, the connection of a tripping device, i.e. of an auxiliary release, and of an external switching element for manual tripping is easily possible for a user.

In one configuration, the connection device is integrated permanently in the detection device. This has the advantage that the circuitry of the connection device can be taken into consideration electronically in the detection device, and it is therefore possible for the tripping device to be connected to the detection device only through a two-wire connection, for example, and nevertheless for two different tripping events (manual tripping and residual current tripping) to be processed.

It is particularly advantageous if the connection device includes two connections, between which a preset voltage is constantly present during operation. As a result, it is possible to trip the tripping device manually, for example by using a pushbutton, with a so-called "floating-potential contact." It is therefore not necessary for there to be an external supply to the external switch or pushbutton.

In this case, the detection device and the tripping device can be constructed in such a way that the tripping device is tripped by a short circuit of the connections of the connection device. Therefore, as indicated above, a very simple mechanism (for example a pushbutton) for tripping the tripping device can be used.

In addition, the tripping device can be in the form of a voltage release. As an alternative to this, the tripping device could be formed as an undervoltage release. In principle, therefore, the residual current protection device according to the invention can be realized in both variants. It is then generally only necessary to equip the detection device correspondingly electrically.

In addition, the tripping device can be connected by cables to the connection device. As a result, the individual components can have a very simple construction, which is certainly of advantage in the case of a few modules.

With the objects of the invention in view, there is also provided an electrical protection configuration, comprising the residual current protection device according to the invention and a circuit breaker.

In accordance with another feature of the invention, preferably the circuit breaker is disposed in a separate housing, which is connectable in a form-locking manner to the housing of the residual current protection device. Both the residual current protection device and the circuit breaker can each have a dedicated housing, which are generally disposed directly next to one another. In this way, a modular system can be provided, from which an electrical protection configuration can be assembled.

The housing of the circuit breaker can have a shaft or an accessory pocket, in which the tripping device is fastened. It is therefore possible to provide a modular system in which auxiliary releases or the like are used.

In addition, the tripping device can be in the form of a module which can be plugged into the housing of the circuit breaker. It therefore does not need to be anchored fixedly in the housing. Therefore, modularity is provided, which guarantees increased individualization of the installations to be constructed.

Other features which are considered as characteristic for the invention are set forth in the appended claims.

Although the invention is illustrated and described herein as embodied in a residual current protection device and an electrical protection configuration for external actuation of an electromagnetic release, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a diagrammatic, vertical-sectional view of an electrical protection configuration according to an exemplary embodiment of the invention having an additional external actuation of an electromagnetic release.

DETAILED DESCRIPTION OF THE INVENTION

Referring now in detail to the single FIGURE of the drawing, there is seen a residual current protection device 4 (RCD) which is the starting point for the following example of an electrical protection configuration 1. The residual current protection device 4 can be a differential current protection unit or residual current protection unit of known construction. In this case, the residual current protection device 4, as is illustrated by way of example in the FIGURE, has a housing 2. Furthermore, the electrical protection configuration 1 includes a circuit breaker 3, which is disposed in a separate housing 15. The housing 2 of the residual current protection device 4 and the housing 15 of the circuit breaker 3 can be connected to one another in a form-locking manner. Typically, the residual current protection device 4 and the circuit breaker 3 are accommodated in switchgear cabinets, where they are connected to corresponding busbars.

The circuit breaker 3 can also be referred to as a main circuit breaker and is used for switching currents and voltages, as are conventional, for example, in production plants, residential buildings or the like. The circuit breaker 3 can include a monitoring device. The voltage and the current intensity in the electrical lines can be detected with this monitoring device. It is possible to determine whether an over current or a short circuit is present from the voltage and/or the current intensity.

The residual current protection device 4 includes a detection device 16. This detection device 16 is a unit capable of detecting a residual current or a differential current in a grid. The power connections of the detection device 16 and of the circuit breaker 3 are not illustrated in the FIGURE for reasons of simplicity. Typically, the power connections, for example a phase and a PEN conductor or three phases and a PEN conductor, are first passed through the detection device 16, then from there through busbars into the circuit breaker 3 and from there finally back to the outside again.

The detection device 16 is, for example, a differential current protection unit or a residual current protection unit. The detection device 16 includes a summation current transformer 18, having an output signal which is different than zero when a residual current or differential current is present. The output signal of the summation current transformer 18 is supplied to an arithmetic logic unit 17. There, the output signal is compared with a threshold value. If the threshold value is exceeded, the circuit breaker 3 can be tripped.

In the example in the FIGURE, the detection device 16 has a connection device 5. The detection device 16 actuates a tripping device 7 through two output terminals 6. For this purpose, cables 8 conduct the output signal from the output terminals 6 to the tripping device 7, for example. The signal transmission also possibly takes place through busbars or the like. The output signal is in each case dependent on whether a residual current or differential current has been detected.

The tripping device 7 is implemented as a voltage release or as an undervoltage release, for example. In the case of a voltage release, tripping takes place if the output signal from the detection device 16 exceeds a voltage threshold. In the case of an undervoltage release, tripping takes place when the output voltage from the detection device 16 falls below a voltage threshold. Generally, the (under)voltage release is implemented magnetically, for which reason it can also be referred to as a tripping magnet. It should substantially initiate a switching operation of the circuit breaker 3. For this purpose, it typically intervenes in a latching mechanism of the circuit breaker 3. The circuit breaker 3 can be switched manually by using a handle 9. The tripping device 7 acts through a suitable mechanism on the handle 9 or directly on the latching mechanism of the circuit breaker 3, for example with the aid of a plunger.

In the present example, three accessory pockets 10, 11 and 12 are provided within the housing 15 of the circuit breaker 3. The central accessory pocket 11 is occupied by the tripping device 7 since the tripping device directly adjoins the handle 9. The accessory pockets 10 and 12 are not occupied in this case and provide space for further internal accessories such as auxiliary or alarm switches.

If the electrical protection configuration 1 is only equipped with the abovementioned components, the auxiliary release, i.e. the modular tripping device 7 plugged into the accessory pocket 11, is used on its own for tripping the circuit breaker 3 in connection with the residual current or differential current functionality. It uses the same interface as a conventional voltage release. In this structural embodiment, therefore, it is not possible for a further tripping magnet or auxiliary release (whether it be voltage release or undervoltage release) to be installed in the residual current protection device in order to test the circuit breaker, for example. However, it is conventional for it to be desired for the circuit breaker to be tripped remotely through a tripping magnet (voltage release or undervoltage release). This is not possible with the known construction of electrical protection configurations 1, which trip the compact circuit breaker or the residual current protection device 3 with the aid of a tripping magnet 7 in an accessory pocket 11 of a compact circuit breaker or the residual current protection device 3.

Therefore, in accordance with the invention, a connection device 5 connected to the tripping device 7 is provided, to which connection device a switching device 13 can also be connected. The connection device 5 in this case is integrated in the residual current protection device 4, for example. In addition to the output terminals 6 in the present example it has at least two input terminals 14. A pushbutton is connected as a switching device 13 to these input terminals 14. The switching device 13 can also be implemented by other switches, such as, for example, a normally closed contact. In addition to simple manual switches, remote-controlled switches or the like can also be used, for example.

In the specific exemplary embodiment shown herein, the detection device 16 permanently generates a predetermined potential, for example a low-voltage potential of 18 V, at one of the input terminals 14. When the pushbutton is open, i.e. when the switching device 13 is open, there is then permanently a corresponding potential difference between the two input terminals 14, which potential difference can be used for actuating the tripping device 7. If the pushbutton is now depressed or the switching device 13 is now closed, the circuit is closed and the tripping magnet (tripping device 7) is activated. Accordingly, the latching mechanism in the circuit breaker 3 is tripped and switches off.

In addition to the use of the tripping device 7 by the differential current unit or the detection device 4, access can also be made to the tripping device 7 externally through two contacts or the tripping device 5 with this invention by virtue of a so-called "floating-potential contact" (in this case a pushbutton). The tripping device 7 of the residual current protection device 4 is therefore used as a voltage release, and it is thus possible to switch off the circuit breaker 3 remotely.

External tripping of the compact circuit breaker or load break switch (i.e. the circuit breaker 3) through the tripping device 7 therefore does not have any influence on the residual current detection device 4. This means that both the tripping display, which typically displays the residual current case, and auxiliary contacts which may be provided, for example for indicator lights, are in this case not activated since the tripping does not actually take place as a result of a residual or differential current.

As a variant, the connection device 5 can also be provided separately from the detection device 4. It can also possibly have dedicated electronics.

Advantageously, the tripping device 7 which is provided therefore acts as residual current or differential current release in the event of a fault and at the same time is used for electrically or manually tripping the circuit breaker remotely. Therefore, no separate accessory pocket for an additional tripping magnet which assists the external tripping is required. Rather, there is space remaining for further internal accessories, such as auxiliary and alarm switches.

The invention claimed is:

1. An electrical protection configuration, comprising:
a circuit breaker; and
a residual current protection device connected to said circuit breaker, the residual current protection device including:
a detection device configured to detect a residual current;
a tripping device configured to be actuated by said detection device and to trip the circuit breaker as a result of said actuation of said tripping device; and
a connection device being connected to said tripping device and being configured to be connected to a switching device;
said detection device and said tripping device being constructed to permit said tripping device to be tripped through said connection device by the switching device independently of the detection device.

2. The electrical protection configuration according to claim 1, which further comprises a housing, said detection device and said connection device being permanently disposed together in said housing.

3. The electrical protection configuration according to claim 1, which further comprises a housing in which said connection device is permanently integrated.

4. The electrical protection configuration according to claim 1, wherein said connection device includes two connections between which a preset voltage is constantly present during operation.

5. The electrical protection configuration according to claim 4, wherein the detection device and said tripping device are constructed to trip said tripping device by a short circuit of said connections of said connection device.

6. The electrical protection configuration according to claim 1, wherein said tripping device is a voltage release device.

7. The electrical protection configuration according to claim 1, which further comprises cables connecting said tripping device to said connection device.

8. The electrical protection configuration according to claim 1, which further comprises a housing of said residual current protection device, and a separate housing of said circuit breaker being form-lockingly connected to said housing of said residual current protection device.

9. The electrical protection configuration according to claim 8, wherein said housing of said circuit breaker has a shaft in which said tripping device is fastened.

10. The electrical protection configuration according to claim 9, wherein said tripping device is a module configured to be plugged into said housing of said circuit breaker.

* * * * *